(12) United States Patent
Doppler et al.

(10) Patent No.: US 9,401,026 B2
(45) Date of Patent: Jul. 26, 2016

(54) METHOD AND APPARATUS FOR IMAGE SEGMENTATION ALGORITHM

(71) Applicant: Nokia Corporation, Espoo (FI)

(72) Inventors: Klaus F. Doppler, Albany, CA (US); Anish Mittal, Berkeley, CA (US); Hoseok Chang, San Jose, CA (US)

(73) Assignee: Nokia Technologies Oy, Espoo (FI)

( * ) Notice: Subject to any disclaimer, the term of this patent is extended or adjusted under 35 U.S.C. 154(b) by 84 days.

(21) Appl. No.: 14/206,079

(22) Filed: Mar. 12, 2014

(65) Prior Publication Data

US 2015/0262367 A1 Sep. 17, 2015

(51) Int. Cl.
| | |
|---|---|
| G06K 9/34 | (2006.01) |
| G06T 7/00 | (2006.01) |
| G06T 1/20 | (2006.01) |
| G06T 3/00 | (2006.01) |
| G06T 3/20 | (2006.01) |
| G06T 3/40 | (2006.01) |
| G06T 5/00 | (2006.01) |
| G06T 5/20 | (2006.01) |
| G06T 7/40 | (2006.01) |

(52) U.S. Cl.
CPC .............. *G06T 7/0079* (2013.01); *G06K 9/34* (2013.01); *G06T 1/20* (2013.01); *G06T 3/0093* (2013.01); *G06T 3/20* (2013.01); *G06T 3/4023* (2013.01); *G06T 5/002* (2013.01); *G06T 5/20* (2013.01); *G06T 7/0081* (2013.01); *G06T 7/408* (2013.01); *G06T 2207/10004* (2013.01); *G06T 2207/10016* (2013.01); *G06T 2207/10024* (2013.01); *G06T 2207/20012* (2013.01); *G06T 2207/20112* (2013.01); *G06T 2207/20141* (2013.01)

(58) Field of Classification Search
USPC ......... 382/162, 164, 181, 194, 176, 248, 305, 382/115, 118; 358/3.06, 3.09, 3.07; 434/156, 185; 345/473; 707/737, 749, 707/915
See application file for complete search history.

(56) References Cited

U.S. PATENT DOCUMENTS 8,149,464 B2 * 4/2012 Kim ........................... 358/3.09

FOREIGN PATENT DOCUMENTS

EP    2 698 764 A1    2/2014

OTHER PUBLICATIONS

Van den Bergh M., et al. "Real-time Stereo and Flow-based Video Segmentation with Superpixels", In IEEE Workshop on Applications of Computer Vision (WACV), 2012, pp. 89-96.
Chang, Jason et al., A Video Representation Using Temporal Superpixels, IEEE Computer Vision and Pattern Recognition (CVPR 2013), Portland, OR, USA, Jun. 25-Jun. 27, 2013, 8 pgs.
Ozan, Sener, et al., Error-tolerant Interactive Image Segmentation using Dynamic and Iterated Graph-Cuts, IMMPD: International workshop on Interactive Multimedia on Mobile and Portable Devices in conjunction with ACM Multimedia 2012, 8 pgs.
Ren, Carl Yuheng, "gSLIC" a real-time implementation of SLIC superpixel segmentation, University of Oxford, Department of Engineering Science, Jun. 28, 2011, 6 pgs.
Lv, Junrui, "An Approach for Superpixels Using Uniform Segmentation and Reciprocal Nearest Neighbors Clustering", Journal of Theoretical and Applied Information Technology, vol. 47, No. 3, Jan. 31, 2013, pp. 1032-1037.
Achanta, Radhakrishna, et al., "SLIC Superpixels Compared to State-of-the-art Superpixel Methods", Journal of Latex Class Files, vol. 6, No. 1, Dec. 2011, 8 pgs.
Achanta, Radhakrishna, et al., "SLIC superpixels", http://infoscience.epfl.ch/record/149300/files/SLIC__Superpixels_TR__2.pdf; Jun. 2010, 16 pgs.
Veksler, Olga, et al., "Superpixels and Supervoxels in an Energy Optimization Framework", Computer Vision—ECCV 2010, pp. 211-224.

* cited by examiner

Primary Examiner — Anh Do
(74) Attorney, Agent, or Firm — Harrington & Smith

(57) ABSTRACT

Cluster centers of an image are initialized. The image includes a plurality of pixels. Pixels of the plurality of pixels in a pattern are labeled. The cluster centers are recomputed based on the labeling of the plurality of pixels.

20 Claims, 7 Drawing Sheets

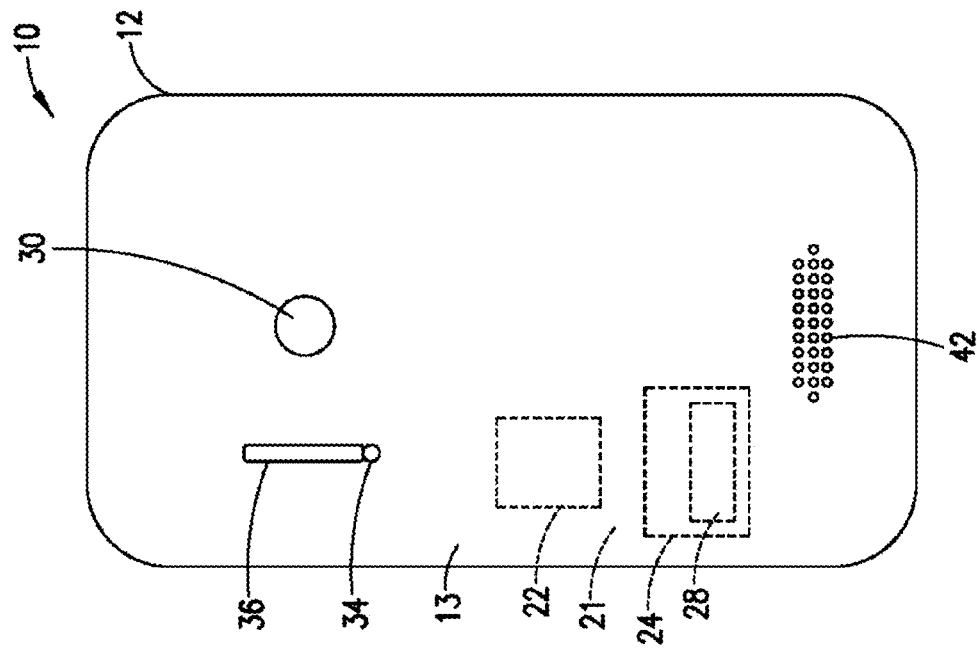
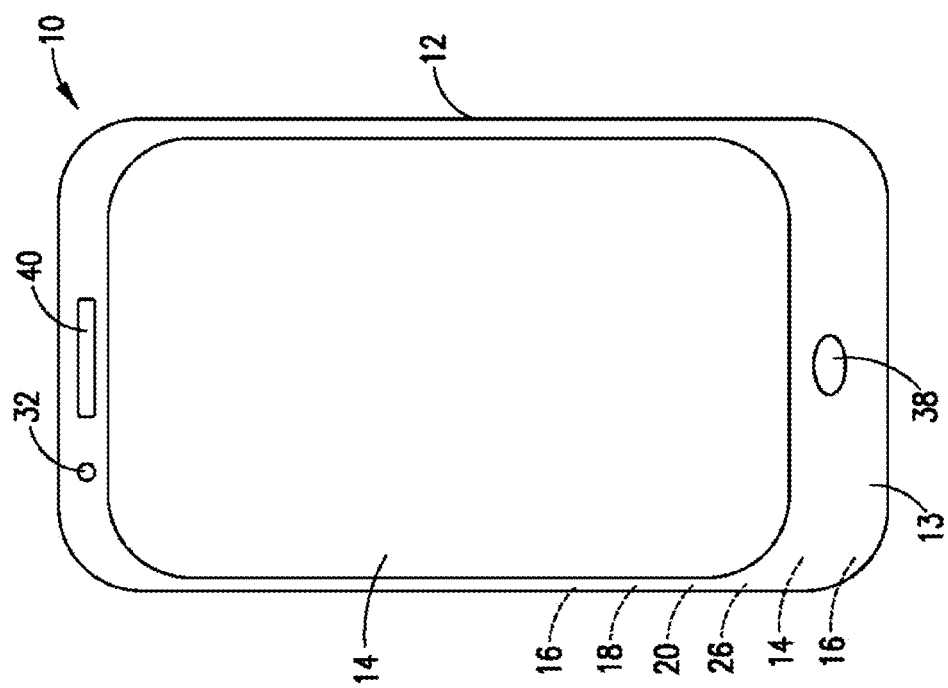

METHOD AND APPARATUS FOR IMAGE SEGMENTATION ALGORITHM

TECHNICAL FIELD

The invention relates to image segmentation and, more particularly, to an implementation of image segmentation algorithm.

BACKGROUND

As electronic devices continue to become more sophisticated, these devices provide an increasing amount of functionality and features. One area gaining popularity in the consumer market is improved camera functionality and features. In particular, computer vision applications have come to rely increasingly on superpixels and superpixel algorithms.

As consumers demand increased functionality from electronic devices, there is a need to provide improved devices having increased capabilities while maintaining robust and reliable product configurations.

SUMMARY

Various aspects of examples of the invention are set out in the claims.

In accordance with one aspect of the invention, a method is disclosed. Cluster centers of an image are initialized. The image includes a plurality of pixels. Pixels of the plurality of pixels in a pattern are labeled. The cluster centers are recomputed based on the labeling of the plurality of pixels.

In accordance with another aspect of the invention, an apparatus is disclosed. The apparatus includes at least one processor, and at least one memory including computer program code. The at least one memory and the computer program code configured to, with the at least one processor, cause the apparatus to perform at least the following: initialize cluster centers of an image, wherein the image includes a plurality of pixels. Label pixels of the plurality of pixels in a pattern. Recompute the cluster centers based on the labeling of the plurality of pixels.

In accordance with another aspect of the invention, a computer program product including a computer-readable medium bearing computer program code embodied therein for use with a computer, the computer program code including: code for initializing cluster centers of an image, wherein the image includes a plurality of pixels. Code for labeling pixels of the plurality of pixels in a pattern. Code for recomputing the cluster centers based on the labeling of the plurality of pixels.

BRIEF DESCRIPTION OF THE DRAWINGS

For a more complete understanding of example embodiments of the present invention, reference is now made to the following descriptions taken in connection with the accompanying drawings in which:

FIG. 1 is a front view of an electronic device incorporating features of the invention;

FIG. 2 is a rear view of the electronic device shown in FIG. 1;

DETAILED DESCRIPTION OF THE DRAWINGS

Figure 3:
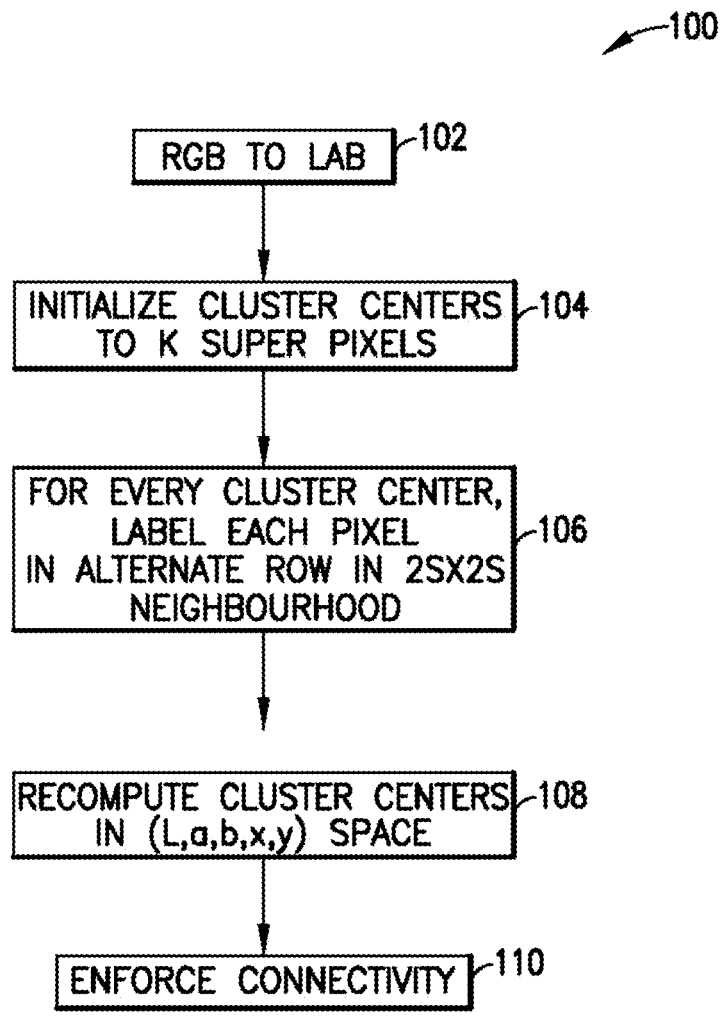
FIG. 3 is a block diagram of an exemplary method of the device shown in FIG. 1.

An example embodiment of the present invention and its potential advantages are understood by referring to FIG. 1 through 10 of the drawings.

Referring to FIG. 1, there is shown a front view of an apparatus 10 incorporating features of an example embodiment. Although the invention will be described with reference to the example embodiments shown in the drawings, it should be understood that the invention can be embodied in many alternate forms of embodiments. In addition, any suitable size, shape or type of elements or materials could be used.

According to one example of the invention, the apparatus 10 is a multi-function portable electronic device. However, in alternate embodiments, features of the various embodiments of the invention could be used in any suitable type of portable electronic device such as a mobile phone, a smartphone, a wearable electronic (or smart) device, a gaming device, a music player, a notebook computer, or a personal digital assistant, for example. In addition, as is known in the art, the device 10 can include multiple features or applications such as a camera, a music player, a game player, an Internet browser, or any other suitable electronic device application, for example.

Referring now also to FIGS. 2, 3, the apparatus 10 generally comprises a housing 12, a touchscreen 14, a receiver 16, a transmitter 18, a controller 20, a rechargeable battery 26 and a camera 30. However, all of these features are not necessary to implement the features described below. The controller 20 may include at least one processor 22, at least one memory 24, and software 28. The electronic circuitry inside the housing 12 may comprise at least one printed wiring board (PWB) 21 having components such as the controller 20 thereon. The receiver 16 and transmitter 18 form a primary communications system to allow the apparatus 10 to communicate with a wireless telephone system, such as a mobile telephone base station for example. However, the apparatus 10 may be configured to communicate with any suitable communication system.

In this example, the apparatus 10 includes the camera 30 which is located at the rear side 13 of the apparatus, a front camera 32, an LED 34, and a flash system 36. The LED 34 and the flash system 36 are also visible at the rear side of the apparatus, and are provided for the camera 30. The cameras 30, 32, the LED 34 and the flash system 36 are connected to the controller 20 such that the controller 20 may control their operation. In an alternate example embodiment the rear side may comprise more than one camera, and/or the front side could comprise more than one camera. The apparatus 10 includes a sound transducer provided as a microphone 38. In an alternate example the apparatus may comprise more than one microphone. The apparatus 10 includes a sound transducer provided as an earpiece 40, and a sound transducer provided as a speaker 42. More or less than one speaker may be provided. It should be noted that in alternate embodiments, the device 10 can have any suitable type of features as known in the art.

According to various exemplary embodiments of the invention, imaging, video and computer vision applications, such as the camera 30 for example, make use of segmentation techniques for superpixel computation in an image/video frame using the local similarity observed in images and videos. Such a representation allows for the reduction in computational complexity of algorithms through the swapping of mega-pixel processing by kilo-superpixel processing. Various exemplary embodiments of the invention provide for ways of minimizing the number of computations needed for pixel to super-pixel conversion by making use of piece smoothness property observed in images and videos, thereby achieving similar performance while consuming lower power and time.

According to various exemplary embodiments of the invention, the camera application of the apparatus 10 is configured to use superpixels and a superpixel algorithm. In particular, a method is provided wherein a superpixel algorithm, simple linear iterative clustering (SLIC), adapts a k-means clustering approach to efficiently generate superpixels.

In general, the only parameter of the algorithm is k, the desired number of approximately equally-sized superpixels. For color images, the clustering procedure begins with an initialization step where k initial cluster centers $C_i = [l_i\ a_i\ b_i\ x_i\ y_i]^T$ are sampled on a regular grid spaced S pixels apart. To produce roughly equally sized superpixels, the grid interval is $S = \sqrt{N/k}$. The centers are moved to seed locations corresponding to the lowest gradient position in a 3×3 neighborhood. This is done to avoid centering a superpixel on an edge, and to reduce the chance of seeding a superpixel with a noisy pixel.

Next, in the assignment step, each pixel i is associated with the nearest cluster center whose search region overlaps its location. This generally speeds up the algorithm because limiting the size of the search region significantly reduces the number of distance calculations, and results in a significant speed advantage over standard k-means clustering where each pixel must be compared with all cluster centers. Since the expected spatial extent of a superpixel is a region of approximate size S×S, the search for similar pixels is done in a region 2S×2S around the superpixel center.

Once each pixel has been associated to the nearest cluster center, an update step adjusts the cluster centers to be the mean $[l\ a\ b\ x\ y]^T$ vector of all the pixels belonging to the cluster. The $L_2$ norm is used to compute a residual error E between the new cluster center locations and previous cluster center locations. The assignment and update steps can be repeated iteratively until the error converges. Finally, a post-processing step enforces connectivity by re-assigning disjoint pixels to nearby superpixels.

According to various exemplary embodiments of the invention, a method for speeding up the iterative computation method of super pixel center estimation in images and videos is provided. The input is generally presented as an array of feature vectors for a pixel in an image and hence of array length equal to number of pixels in the image. The method finds superpixels centers that closely represent pixels that are locally similar in feature space.

For example, according to various exemplary embodiments of the invention, an improvement to the SLIC algorithm described above is provided wherein even and odd rows of pixels in an image/video frame are chosen during alternate iterations. This assumption is based on the fact of local smoothness observed in images and hence similar labels for alternate rows and columns. For every iteration, such a mechanism reduces the number of computations by two. Even rows get their labels from odd rows and vice versa. In the various exemplary embodiments, the algorithm is run on the whole image for the last iteration. In addition to processing alternate rows, the super-pixel computation can be sped up for videos. Instead of brute-force calculation of superpixels on each frame, the super pixel centers for the current frame are initialized based on the super pixel centers from previous frame in the video and the method is generally only run for half the number of iterations for the new frame. The assumption stands on the fact that a video is locally smooth in time and hence initialization of super pixels from previous frame leads to much faster convergence. The algorithms run for full number of iterations only for the first frame but the successive frames save time by cutting down the number of computations by two. In other embodiments also the first frame uses only a single iteration.

FIG. 3 illustrates a method 100. The method 100 includes converting R,G,B to a Lab color space (at block 102). Initializing cluster centers to K super pixels (at block 104). For every cluster center, labeling each pixel in alternate row in a 2S×2S neighborhood (at block 106). Recomputing cluster centers in (L,a,b,x,y) (at block 108). Enforcing connectivity (at block 110). It should be noted that in some embodiments, labeling each pixel in an alternate row is not required. It should further be noted that the illustration of a particular order of the blocks does not necessarily imply that there is a required or preferred order for the blocks and the order and arrangement of the blocks may be varied. Furthermore it may be possible for some blocks to be omitted.

According to various exemplary embodiments of the invention, the feature vector with the {x, y, l, a, b} value for each pixel may be instantiated. Alternately, the algorithm can also be implemented on alternate columns on the transposed image.

According to various exemplary embodiments of the invention, execution speed can be increased by close to about 50% for still images and by about 80% for video images.

Figure 4:
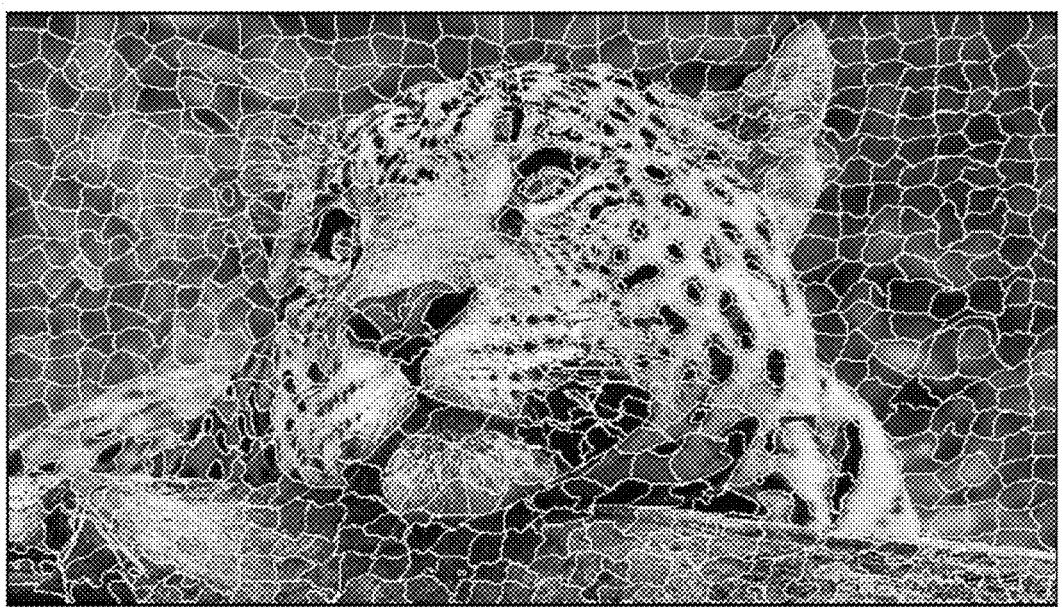
FIG. 4 illustrates segmentation results for alternative row simple linear iterative clustering.
Figure 5:
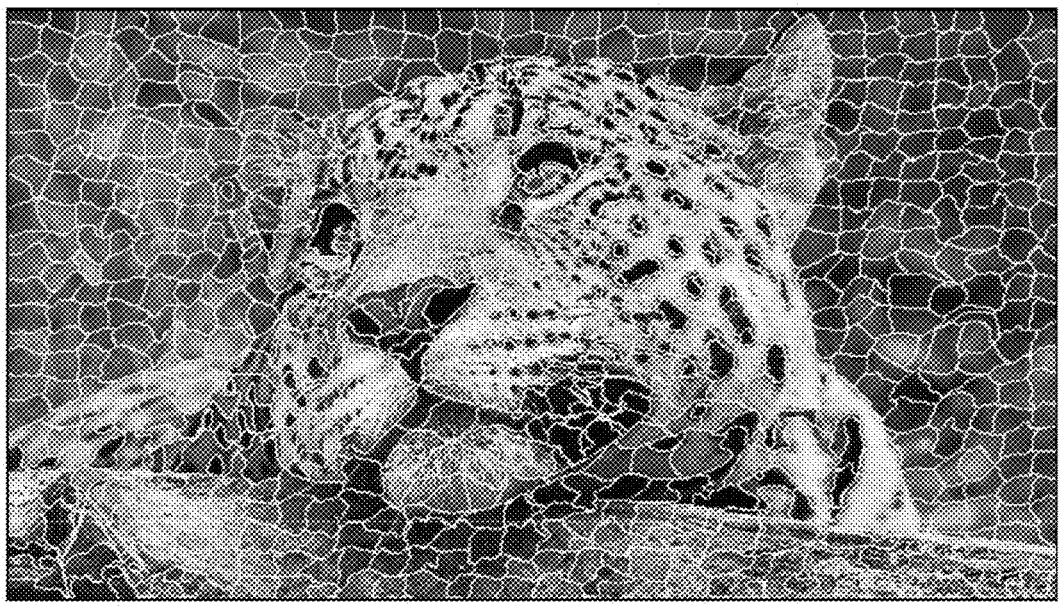
FIG. 5 illustrates segmentation results for full row simple linear iterative clustering.
Figure 6:
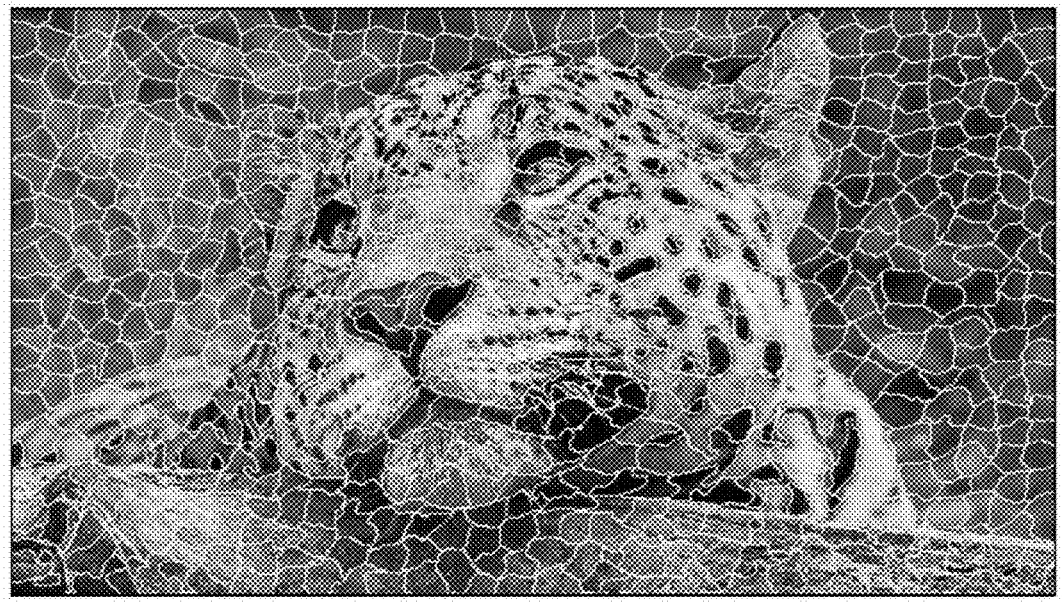
FIG. 6 illustrates segmentation results for alternative row simple linear iterative clustering.
Figure 7:
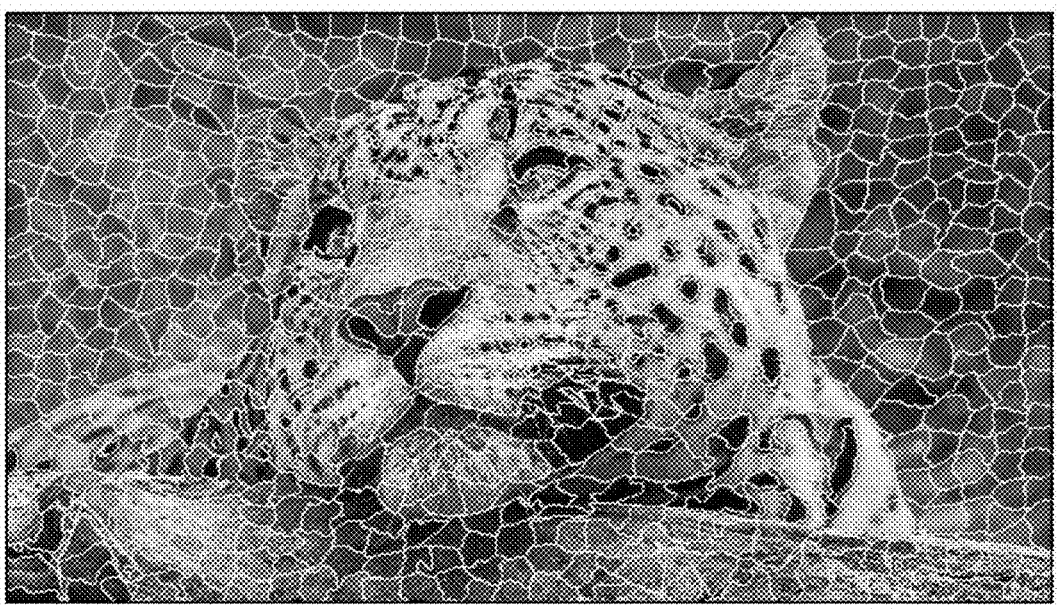
FIG. 7 illustrates segmentation results for full row simple linear iterative clustering.

For example, and now referring also to FIGS. 4-7, there are shown various image segmentation results. FIG. 4 illustrates a segmentation result of two iterations of alternative row SLIC (70 msec). FIG. 5 illustrates a segmentation result of two iterations of full row SLIC (110 msec). FIG. 6 illustrates a segmentation result of five iterations of alternative row SLIC (120 msec). FIG. 7 illustrates a segmentation result of five iterations of full row SLIC (280 msec). As shown in comparing the images of FIGS. 4 and 5, and FIGS. 6 and 7, it can be seen that the alternative row SLIC (FIGS. 4, 6) produces comparable results to conventional approaches (i.e. full row) with consuming significantly less processing time.

Figure 8:
FIG. 8 illustrates segmentation results for a video sequence with two iterations per frame.
Figure 9:
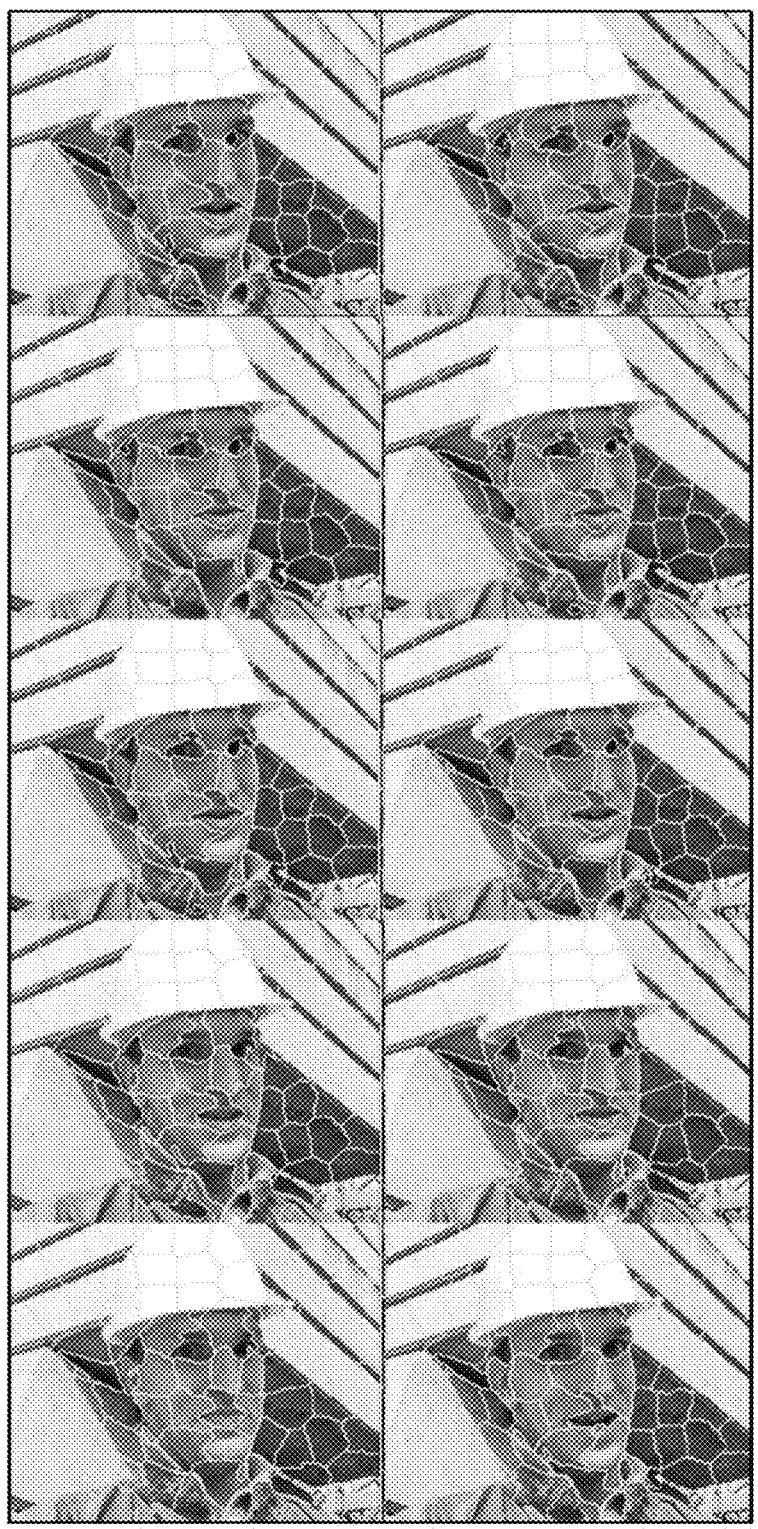
FIG. 9 illustrates a video sequence with five iterations per frame.

Referring now also to FIGS. 8, 9, these figures confirm that similar performance is achieved when clusters are initialized from previous frame while achieving drastic reduction in computational time. For example, FIG. 8 illustrates a segmentation result of a video sequence according to various exemplary embodiments of the invention (such as, using previous segmentation result for next frame and run two iterations per frame, for example). While, FIG. 9 illustrates a segmentation result of a video sequence using a conventional method (such as, running five iterations per frame, for example).

Technical effects of any one or more of the exemplary embodiments provide a faster implementation of SLIC—super pixel based image segmentation in an apparatus (such as computing devices and mobile phones) when compared to conventional methods. For example, in general superpixel estimation algorithms are computational and memory resource-greedy. In conventional methods (where each pixel is labeled in every row [without alternating rows] in 2S×2S neighborhood), this problem becomes even more pronounced when such algorithms are programmed on smart or wearable devices with limited available resource hardware. Compelling user experiences made feasible using super pixel computation are soft pedaled because of the inability to make them happen in real time. However, according to various exemplary embodiments of the invention, realistic algorithmic assumptions are provided that significantly reduce the computational time.

Without in any way limiting the scope, interpretation, or application of the claims appearing below, a technical effect of one or more of the example embodiments disclosed herein is providing an optimized SLIC [Simple Linear Iterative Clustering]). Another technical effect of one or more of the example embodiments disclosed herein is calculate/finding super pixel centres by selecting even and odd rows of pixels in an image/video during alternate iterations. Another technical effect of one or more of the example embodiments disclosed herein is initializing the super pixel centres for the current frame based on the super pixel centres from previous frame in the video and the method is only run for half the number of iterations for the new frame.

For example, according to one example of the invention, a method is provided to speed up the process of super pixel centre estimation in images and videos. The proposed method is an improvement of SLIC (Simple Linear Iterative Clustering) algorithm, wherein even and odd rows of pixels in an image/video are selected during alternate iterations for calculating the super pixel centres. Even rows of pixels get their labels from odd rows and vice versa. The algorithm can be further speeded up, by initializing the super pixel centres for the current frame based on the super pixel centres from previous frame in the video and the method is only ran for half the number of iterations for the new frame.

According to some embodiments of the invention, the superpixel calculation can be used in multiple applications (such as, Cinemagraph to select objects, depth map calculations, and so forth).

Figure 10:
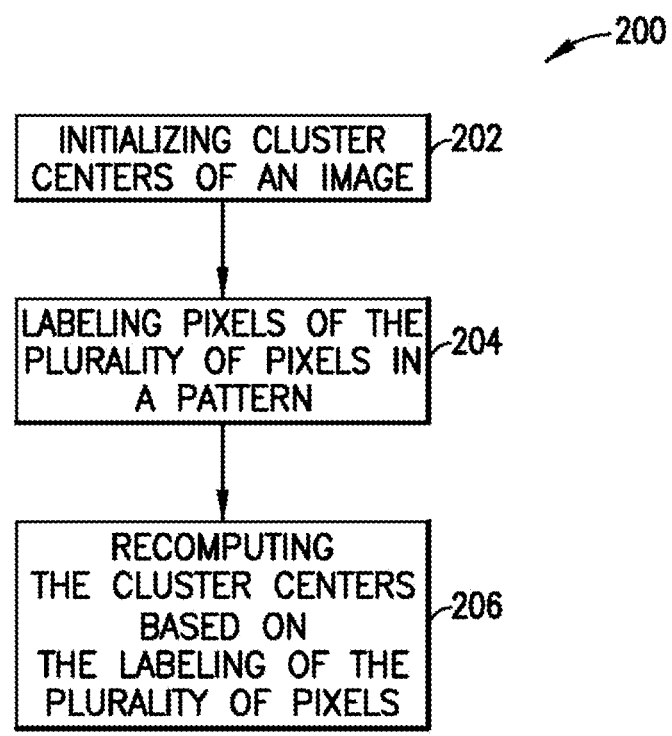
FIG. 10 is a block diagram of another exemplary method of the device shown in FIG. 1.

FIG. 10 illustrates a method 200. The method 200 includes initializing cluster centers of an image, wherein the image comprises a plurality of pixels (at block 202). Labeling pixels of the plurality of pixels in a pattern (at block 204). Recomputing (or recalculating) the cluster centers based on the labeling of the plurality of pixels (at block 206). It should be noted that in some embodiments, each pixel of the plurality of pixels are labeled in a pattern. It should further be noted that, the pattern may comprise at least one of alternate rows, alternate columns, every n-th column or row, or a repeating pattern taking parts of a first row and remaining part of a second row. However any suitable combination of the features above may be provided. It should be noted that the illustration of a particular order of the blocks does not necessarily imply that there is a required or preferred order for the blocks and the order and arrangement of the blocks may be varied. Furthermore it may be possible for some blocks to be omitted.

It should be understood that components of the invention can be operationally coupled or connected and that any number or combination of intervening elements can exist (including no intervening elements). The connections can be direct or indirect and additionally there can merely be a functional relationship between components.

As used in this application, the term 'circuitry' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Embodiments of the present invention may be implemented in software, hardware, application logic or a combination of software, hardware and application logic. The software, application logic and/or hardware may reside on the device 10 (such as on the memory 24, or another memory of the device), on a server, or any other suitable location. If desired, part of the software, application logic and/or hardware may reside on device, and part of the software, application logic and/or hardware may reside on the server. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 2. A computer-readable medium may comprise a computer-readable storage medium that may be any media or means that can contain or store the instructions for use by or in connection with an instruction execution system, apparatus, or device, such as a computer.

Any combination of one or more computer readable medium(s) may be utilized as the memory. The computer readable medium may be a computer readable signal medium or a non-transitory computer readable storage medium. A non-transitory computer readable storage medium does not include propagating signals and may be for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Below are provided further descriptions of various non-limiting, exemplary embodiments. The below-described exemplary embodiments may be practiced in conjunction with one or more other aspects or exemplary embodiments. That is, the exemplary embodiments of the invention, such as those described immediately below, may be implemented, practiced or utilized in any combination (for example, any combination that is suitable, practicable and/or feasible) and are not limited only to those combinations described herein and/or included in the appended claims.

In one exemplary embodiment a method, comprising: initializing cluster centers of an image, wherein the image comprises a plurality of pixels; labeling pixels of the plurality of pixels in a pattern; and recomputing the cluster centers based on the labeling of the plurality of pixels.

The method as above wherein the labeling comprises labeling each pixel of the plurality of pixels.

The method as above wherein the pattern comprises at least one of alternate rows, alternate columns, every n-th column or row, or a repeating pattern taking parts of a first row and remaining part of a second row.

The method as above wherein the initializing of the cluster centers further comprises initializing cluster centers to K super pixels.

The method as above wherein the labeling of each pixel further comprises, for every cluster center, labeling each pixel in an alternate row in a 2S×2S neighborhood.

The method as above wherein the recomputing of the cluster center further comprises recomputing the cluster centers in (L, a, b, x, y) space.

The method as above further comprising converting R,G,B to a Lab color space.

The method as above wherein the image comprises a still image.

The method as above wherein the image comprises a video image.

In another exemplary embodiment, an apparatus, comprising: at least one processor; and at least one memory including computer program code. The at least one memory and the computer program code configured to, with the at least one processor, cause the apparatus to perform at least the following: initialize cluster centers of an image, wherein the image comprises a plurality of pixels; label pixels of the plurality of pixels in a pattern; and recompute the cluster centers based on the labeling of the plurality of pixels.

The apparatus as above wherein the at least one memory and the computer program code configured to, with the at least one processor, further cause the apparatus to label each pixel of the plurality of pixels.

The apparatus as above wherein the pattern comprises at least one of alternate rows, alternate columns, every n-th column or row, or a repeating pattern taking parts of a first row, and remaining part of a second row.

The apparatus as above wherein the at least one memory and the computer program code configured to, with the at least one processor, further cause the apparatus to recompute the cluster centers in (L, a, b, x, y) space.

The apparatus as above wherein the apparatus comprises a camera, and wherein the image comprises a still image or a video image.

The apparatus as above wherein the apparatus comprises a computing device.

The apparatus as above wherein the apparatus comprises a mobile phone.

In yet another exemplary embodiment, a computer program product comprising a computer-readable medium bearing computer program code embodied therein for use with a computer, the computer program code comprising: code for initializing cluster centers of an image, wherein the image comprises a plurality of pixels; code for labeling pixels of the plurality of pixels in a pattern; and code for recomputing the cluster centers based on the labeling of the plurality of pixels.

The computer program product as above wherein the code for labeling comprises labeling each pixel of the plurality of pixels.

The computer program product as above wherein the pattern comprises at least one of alternate rows, alternate columns, every n-th column or row, or a repeating pattern taking parts of a first row and remaining part of a second row.

The computer program product as above wherein the labeling of each pixel further comprises, for every cluster center, labeling each pixel in an alternate row in a 2S×2S neighborhood.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It should be understood that the foregoing description is only illustrative of the invention. Various alternatives and modifications can be devised by those skilled in the art without departing from the invention. Accordingly, the invention is intended to embrace all such alternatives, modifications and variances which fall within the scope of the appended claims.

What is claimed is:

1. A method, comprising:
   initializing cluster centers of an image using a processor, wherein the image comprises a plurality of pixels;
   labeling pixels of the plurality of pixels in a pattern using the processor; and
   recomputing, using the processor, the cluster centers based on the labeling of the plurality of pixels.

2. The method of claim 1 wherein the labeling comprises labeling each pixel of the plurality of pixels.

3. The method of claim 1 wherein the pattern comprises at least one of alternate rows, alternate columns, every n-th column or row, or a repeating pattern taking parts of a first row and remaining part of a second row.

4. The method of claim 1 wherein the initializing of the cluster centers further comprises initializing cluster centers to K super pixels.

5. The method of claim 1 wherein the labeling of each pixel further comprises, for every cluster center, labeling each pixel in an alternate row in a 2S×2S neighborhood.

6. The method of claim 1 wherein the recomputing of the cluster center further comprises recomputing the cluster centers in (L, a, b, x, y) space.

7. The method of claim 1 further comprising converting R,G,B to a Lab color space.

8. The method of claim 1 wherein the image comprises a still image.

9. The method of claim 1 wherein, the image comprises a video image.

10. An apparatus, comprising:
    at least one processor; and
    at least one non-transitory memory including computer program code
    the at least one non-transitory memory and the computer program code configured to, with the at least one processor, cause the apparatus to perform at least the following:
    initialize cluster centers of an image, wherein the image comprises a plurality of pixels;

label pixels of the plurality of pixels in a pattern; and
recompute the cluster centers based on the labeling of the plurality of pixels.

11. The apparatus of claim 10 wherein the at least one memory and the computer program code configured to, with the at least one processor, further cause the apparatus to label each pixel of the plurality of pixels.

12. The apparatus of claim 10 wherein the pattern comprises at least one of alternate rows, alternate columns, every n-th column or row, or a repeating pattern taking parts of a first row and remaining part of a second row.

13. The apparatus of claim 10 wherein the at least one memory and the computer program code configured to, with the at least one processor, further cause the apparatus to recompute the cluster centers in (L, a, b, x, y) space.

14. The apparatus of, claim 10 wherein the apparatus comprises a camera, and wherein the image comprises a still image or a video image.

15. The apparatus of claim 10 wherein the apparatus comprises a computing device.

16. The apparatus of claim 10 wherein the apparatus comprises a mobile phone.

17. A computer program product comprising a non-transitory computer-readable medium bearing computer program code embodied therein for use with a computer, the computer program code comprising:
code for initializing cluster centers of an image, wherein the image comprises a plurality of pixels;
code for labeling pixels of the plurality of pixels in a pattern; and
code for recomputing the cluster centers based on the labeling of the plurality of pixels.

18. The computer program product of claim 17 wherein the code for labeling comprises labeling each pixel of the plurality of pixels.

19. The computer program product of claim 17 wherein the pattern comprises at least one of alternate rows, alternate columns, every n-th column or row, or a repeating pattern taking parts of a first row and remaining part of a second row.

20. The computer program product of claim 17 wherein the labeling of each pixel further comprises, for every cluster center, labeling each pixel in an alternate row in a 2S×2S neighborhood.

* * * * *